(12) United States Patent
Hill

(10) Patent No.: US 7,292,531 B1
(45) Date of Patent: Nov. 6, 2007

(54) METHODS, APPARATUSES AND SYSTEMS FACILITATING ANALYSIS OF THE PERFORMANCE OF NETWORK TRAFFIC CLASSIFICATION CONFIGURATIONS

(75) Inventor: Mark Hill, Los Altos, CA (US)

(73) Assignee: Packeteer, Inc., Copertino, CA (US)

( * ) Notice: Subject to any disclaimer, the term of this patent is extended or adjusted under 35 U.S.C. 154(b) by 1089 days.

(21) Appl. No.: 10/334,467

(22) Filed: Dec. 31, 2002

(51) Int. Cl.
*H04L 12/26* (2006.01)
*H04L 12/56* (2006.01)
*G06F 15/173* (2006.01)

(52) U.S. Cl. ............. 370/230.1; 370/392; 370/395.21; 370/395.31; 709/225

(58) Field of Classification Search ........ 370/229–236, 370/392, 395.2, 400–401; 709/220–226, 709/238
See application file for complete search history.

(56) References Cited

U.S. PATENT DOCUMENTS

| 6,772,223 B1 * | 8/2004 | Corl et al. ................... 709/238 |
| 6,876,668 B1 * | 4/2005 | Chawla et al. ............... 370/468 |
| 6,934,745 B2 * | 8/2005 | Krautkremer ................ 709/223 |
| 7,010,611 B1 * | 3/2006 | Wiryaman et al. .......... 709/232 |
| 2002/0027924 A1 * | 3/2002 | Fukushima et al. .......... 370/401 |

* cited by examiner

*Primary Examiner*—Chi Pham
*Assistant Examiner*—Tri H. Phan
(74) *Attorney, Agent, or Firm*—Mark J. Spolyar

(57) ABSTRACT

Methods apparatuses and systems allowing for an examination of the runtime performance and efficiency of traffic classification configuration associated with bandwidth management and other network devices including network traffic classification functionality. Embodiments of the present invention are operative to identify possible changes to the current traffic classification configurations that improve performance efficiency.

23 Claims, 6 Drawing Sheets

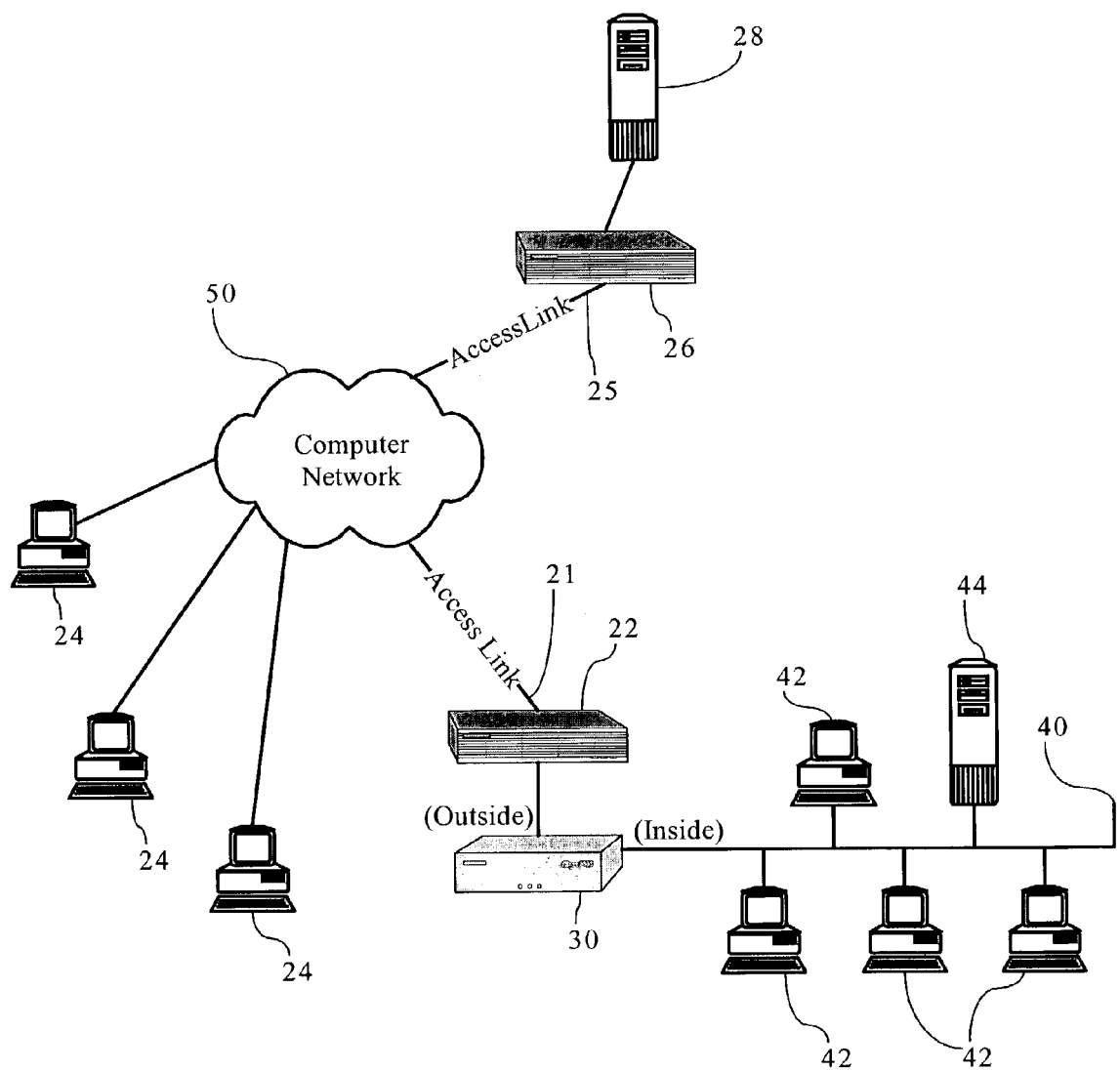
Fig._1

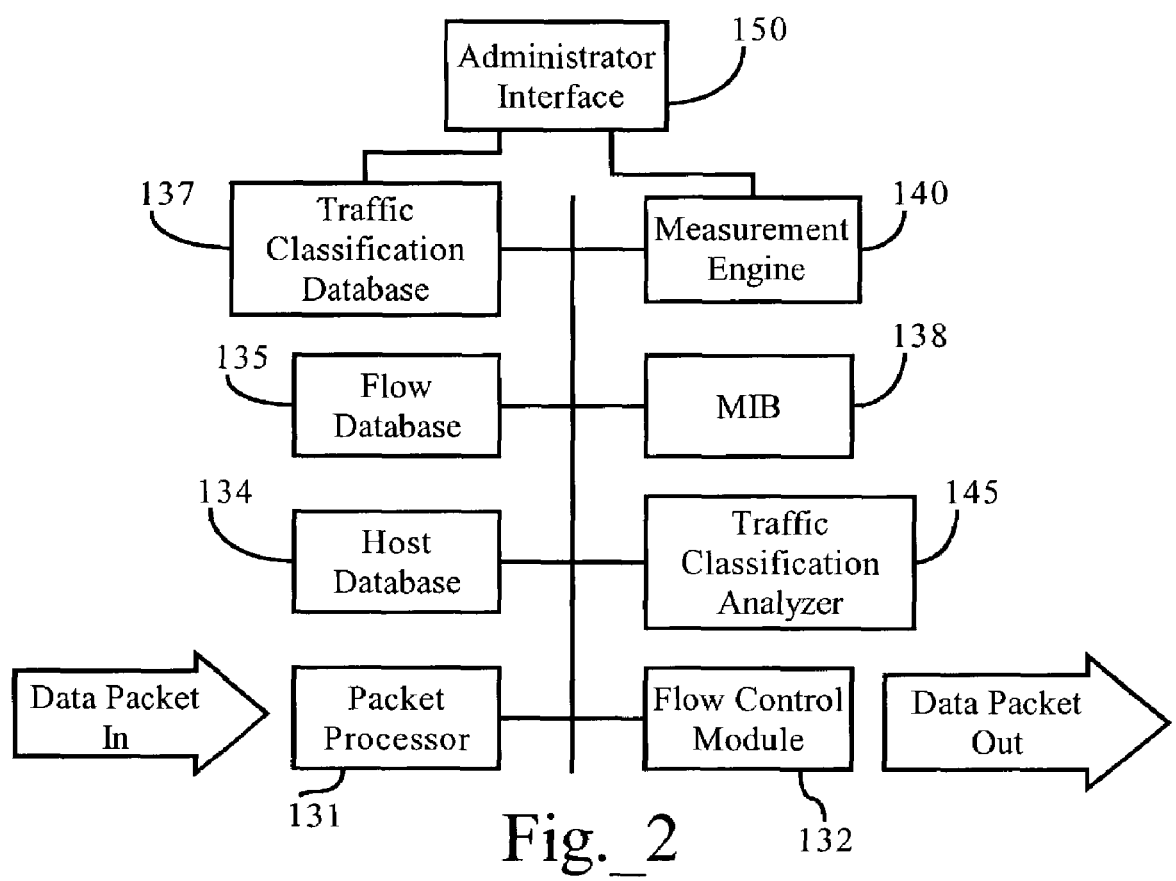
Fig._2

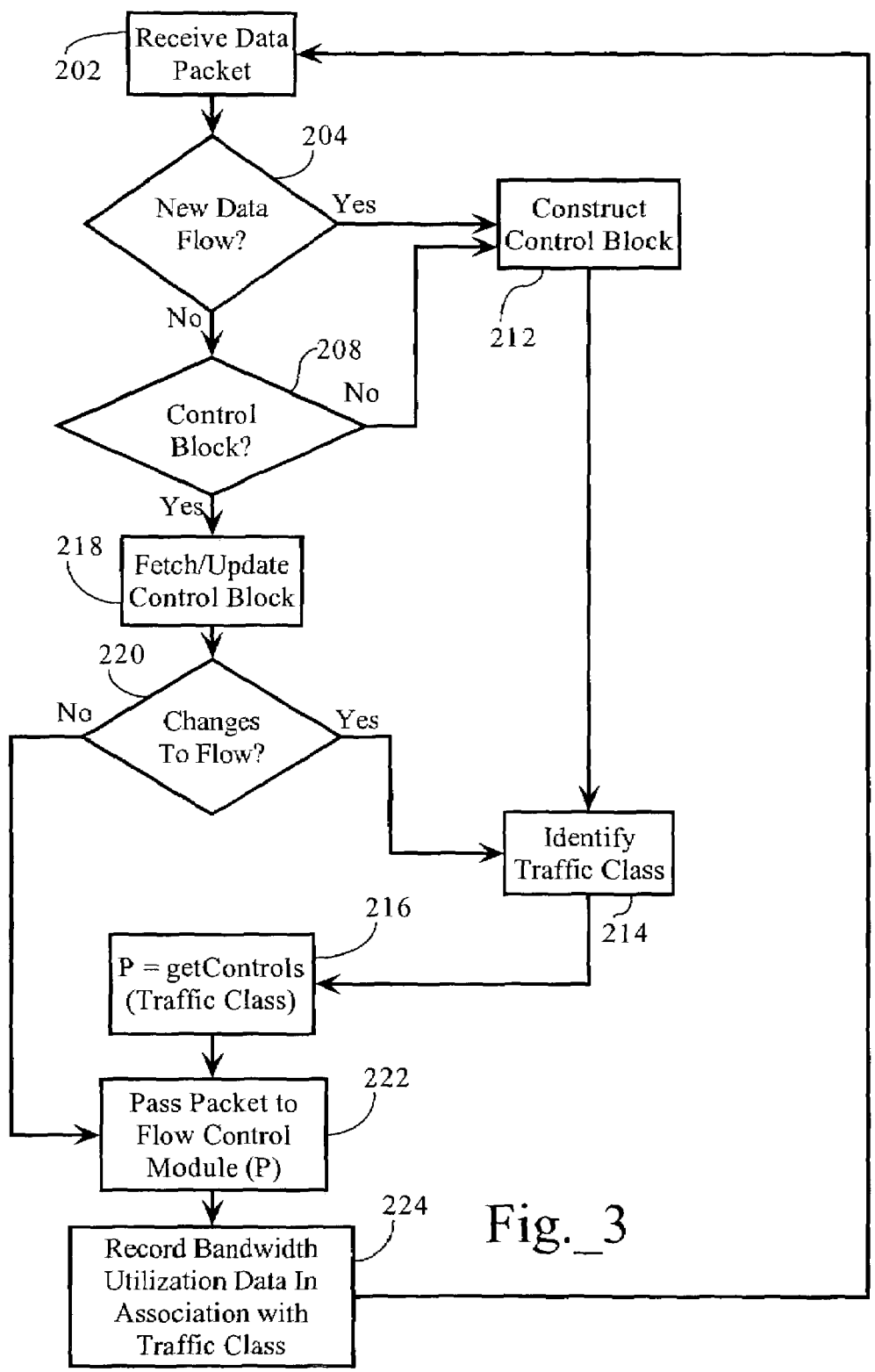
Fig._3

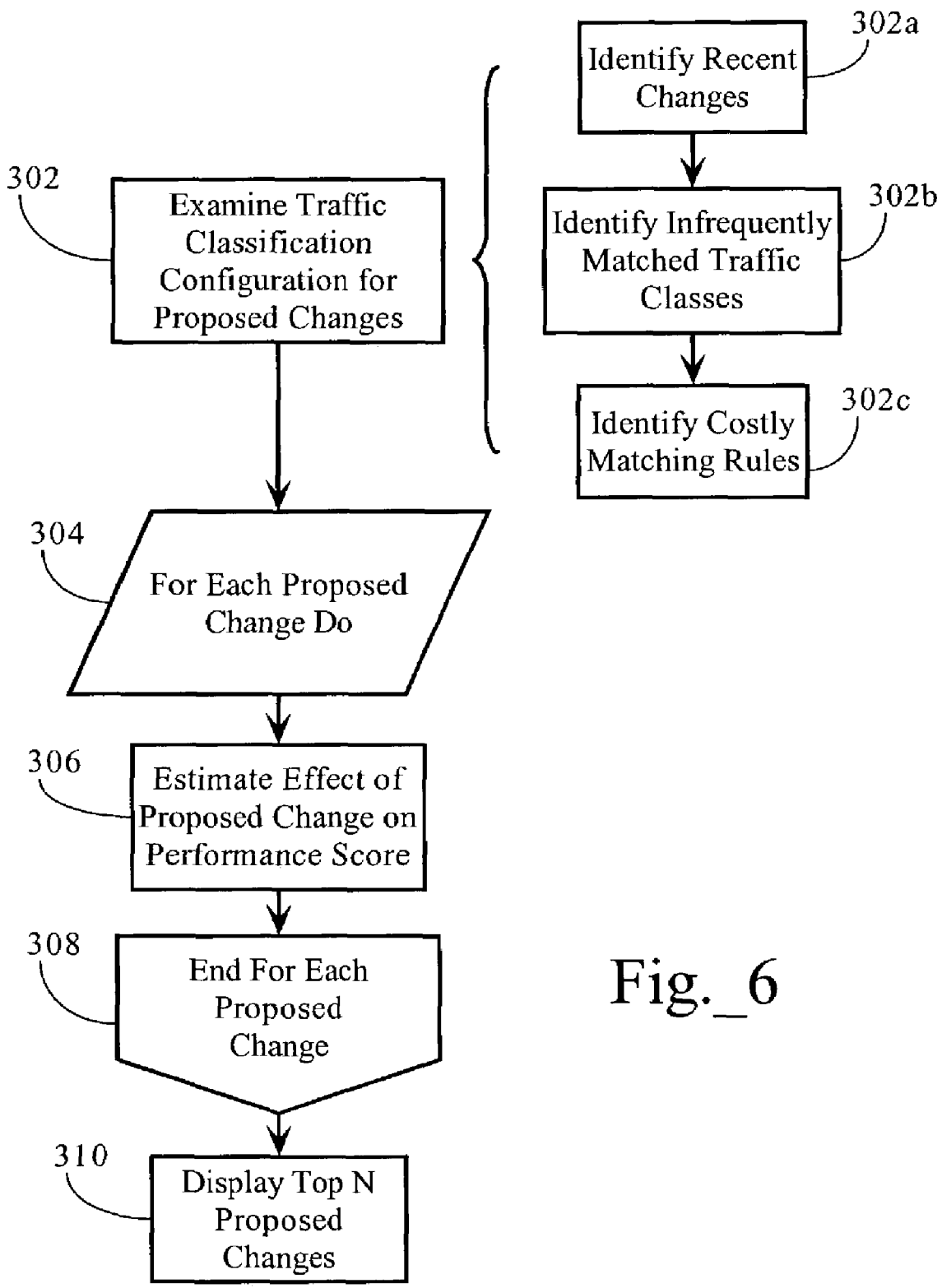
Fig._6

METHODS, APPARATUSES AND SYSTEMS FACILITATING ANALYSIS OF THE PERFORMANCE OF NETWORK TRAFFIC CLASSIFICATION CONFIGURATIONS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Rober L. Packer, Brett D. Galloway and Ted Thi, entitled "Method for Data Rate Control for Heterogeneous or Peer Internetworking;"

U.S. patent application Ser. No. 09/885,750, in the name of Scott Hankins and Brett Galloway, entitled "System and Method For Dynamically Controlling a Rogue Application Through Incremental Bandwidth Restrictions;"

U.S. patent application Ser. No. 09/966,538, in the name of Guy Riddle, entitled "Dynamic Partitioning of Network Resources;"

U.S. patent application Ser. No. 10/039,992, in the Michael J. Quinn and Mary L. Laier, entitled "Method and Apparatus for Fast Lookup of Related Classification Entities in a Tree-Ordered Classification Hierarchy;"

U.S. patent application Ser. No. 10/015,826, in the name of Guy Riddle entitled "Dynamic Tunnel Probing in a Communications Network;"

U.S. patent application Ser. No. 10/104,238, in the name of Robert Purvy and Mark Hill, entitled "Methods and Systems Allowing for Non-Intrusive Network Management;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936, in the name of Guy Riddle, Robert L. Packer and Mark Hill, entitled "Method for Automatically Classifying Traffic with Enhanced Hierarchy in a Packet Communications Network;"

U.S. patent application Ser. No. 10/177,518, in the name of Guy Riddle, entitled "Methods, Apparatuses and Systems Allowing for Progressive Network Resource Utilization Control Scheme;"

U.S. patent application Ser. No. 10/178,617, in the name of Robert E. Purvy, entitled "Methods, Apparatuses and Systems Facilitating Analysis of Network Device Performance;" and U.S. patent application Ser. No. 10/236,149, in the name of Brett Galloway and George Powers, entitled "Classification Data Structure enabling Multi-Dimensional Network Traffic Classification and Control Schemes."

FIELD OF THE INVENTION

The present invention relates to computer networks and classification of network traffic, and, more particularly, to methods, apparatuses and systems allowing for analysis of the performance of network traffic classification configurations.

BACKGROUND OF THE INVENTION

Efficient allocation of network resources, such as available network bandwidth, has become critical as enterprises increase reliance on distributed computing environments and wide area computer networks to accomplish critical tasks. The widely-used TCP/IP protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

In order to understand the context of certain embodiments of the invention, the following provides an explanation of certain technical aspects of a packet based telecommunications network environment. Internet/Intranet technology is based largely on the TCP/IP protocol suite. At the network level, IP provides a "datagram" delivery service-that is, IP is a protocol allowing for delivery of a datagram or packet between two hosts. BY contrast, TCP provides a transport level service on top of the datagram service allowing for guaranteed delivery of a byte stream between two IP hosts. In other words, TCP is responsible for ensuring at the transmitting host that message data is divided into packets to be sent, and for reassembling, at the receiving host, the packets back into the complete message.

TCP has "flow control" mechanisms operative at the end stations only to limit the rate at which a TCP endpoint will emit data, but it does not employ explicit data rate control. The basic flow control mechanism is a "sliding window", a window which by its sliding operation essentially limits the amount of unacknowledged transmit data that a transmitter is allowed to emit. Another flow control mechanism is a congestion window, which is a refinement of the sliding window scheme involving a conservative expansion to make use of the full, allowable window.

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is re-transmitted. Data rate flow control mechanisms which are operative end-to-end without explicit data rate control draw a strong inference of congestion from packet loss (inferred, typically, by RTO). TCP end systems, for example, will "back-off"—i.e., inhibit transmission in increasing multiples of the base RTT average as a reaction to consecutive packet loss.

A crude form of bandwidth management in TCP/IP networks (that is, policies operable to allocate available bandwidth from a single logical link to network flows) is accomplished by a combination of TCP end systems and routers which queue packets and discard packets when some congestion threshold is exceeded. The discarded and therefore unacknowledged packet serves as a feedback mechanism to the TCP transmitter. Routers support various queuing options to provide for some level of bandwidth management. These options generally provide a rough ability to partition and prioritize separate classes of traffic. However, configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users. Moreover, while routers can slow down inbound network traffic by dropping packets as a feedback mechanism to a TCP transmitter, this method often results in retransmission of data packets, wasting network traffic and, especially, inbound capacity of a WAN link. In addition, routers can only explicitly control outbound traffic and cannot prevent inbound traffic from over-utilizing a WAN link. A 5% load or less on outbound traffic can correspond to a 100% load on inbound traffic, due to the typical imbalance between an outbound stream of acknowledgments and an inbound stream of data.

In response, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic type. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions. With some network devices, these partitions can be configured to ensure a minimum bandwidth and/or cap bandwidth as to a particular class of traffic. An administrator specifies a traffic class (such as FTP data, or data flows involving a specific user) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (protecting and/or capping bandwidth for a particular user). In addition, certain bandwidth management devices allow administrators to define a partition hierarchy by configuring one or more partitions dividing the access link and further dividing the parent partitions into one or more child partitions.

To facilitate the implementation, configuration and management tasks associated with bandwidth management and other network devices including traffic classification functionality, various traffic classification configuration models and data structures have been implemented. For example, various routers allow network administrators to configure access control lists (ACLs) consisting of an ordered set of access control entries (ACEs). Each ACE contains a number of fields that are matched against the attributes of a packet entering or exiting a given interface. In addition, each ACE has an associated action that indicates what the routing system should do with the packet when a match occurs. ACLs can be configured to accomplish or facilitate a variety of tasks, such as security, redirection, caching, encryption, network address translation, and policy routing. Once configured by an administrator, the routing system compiles the ACL into a hash table to expedite the look up process during operation of the system.

In addition, U.S. Pat. No. 6,412,000 discloses methods and system that automatically classify network traffic according to a set of classification attributes. As this patent teaches, the traffic classification configuration can be arranged in a hierarchy, where classification of a particular packet or data flow traverses a network traffic classification tree until a matching leaf traffic class, if any, is found. Such prior art classification trees are data structures reflecting the hierarchical aspect of traffic class relationships, wherein each node of the tree represents a traffic class and includes a set of attributes or matching rules characterizing the traffic class. The traffic classification, at each level of the hierarchy, determines whether the data flow or packet matches the attributes of a given traffic class node and, if so, continues the process for child traffic class nodes down to the leaf nodes. In certain modes, unmatched data flows map to a default traffic class.

Classification of network traffic, especially for systems classifying traffic based on attributes up to and including Layer 7 of the OSI reference model, can consume substantial CPU and memory resources. Certain traffic classification mechanisms feature certain optimizations to improve the efficiency of matching of data flows with traffic classes. For example, patent application Ser. No. 10/039,992 discloses methods for caching portions of hierarchical classification trees in hash tables to optimize and improve the efficiency of traffic classification lookups. If the traffic classification hierarchy is well-ordered (for example, contains a list of IP-address based classes), the efficiency of traffic classification can be enhanced. However, a network administrator may inadvertently configure the traffic classification scheme (such as a hierarchical classification tree) such that these optimizations are by-passed and/or the application of matching rules is inefficient taking into account the traffic types actually encountered by the bandwidth management or other network device. Despite such optimization mechanisms, there is currently now way to easily determine whether such optimization provide any benefit, such as reducing CPU load. In addition, no mechanism currently exists to determine the efficiency of traffic classification schemes configured by network administrators.

In light of the foregoing, a need in the art exists for methods, apparatuses and systems allowing for examinations of the efficiency of network traffic classification configurations in bandwidth management and other network devices. Embodiments of the present invention substantially fulfill this need.

SUMMARY OF THE INVENTION

The present invention provides methods, apparatuses and systems allowing for an examination of the runtime performance and efficiency of traffic classification configurations associated with bandwidth management and other network devices including network traffic classification functionality. Embodiments of the present invention are operative to identify possible changes to the current traffic classification configurations that improve performance efficiency.

DESCRIPTION OF THE DRAWINGS

FIG. 1 is a functional block diagram illustrating a computer network environment including a bandwidth management device according to an embodiment of the present invention.

FIG. 2 is a functional block diagram setting forth the functionality in a bandwidth management device according to an embodiment of the present invention.

FIG. 3 is a flow chart providing a method directed to processing data packets to allow for enforcement of bandwidth utilization and other controls on network data flows.

FIG. 6 is a flow chart diagram setting forth a method associated with operation of a traffic classification configuration wizard according to an embodiment of the present invention.

DESCRIPTION OF PREFERRED EMBODIMENT(S)

I. Exemplary Operating Environment

Figure 4A:
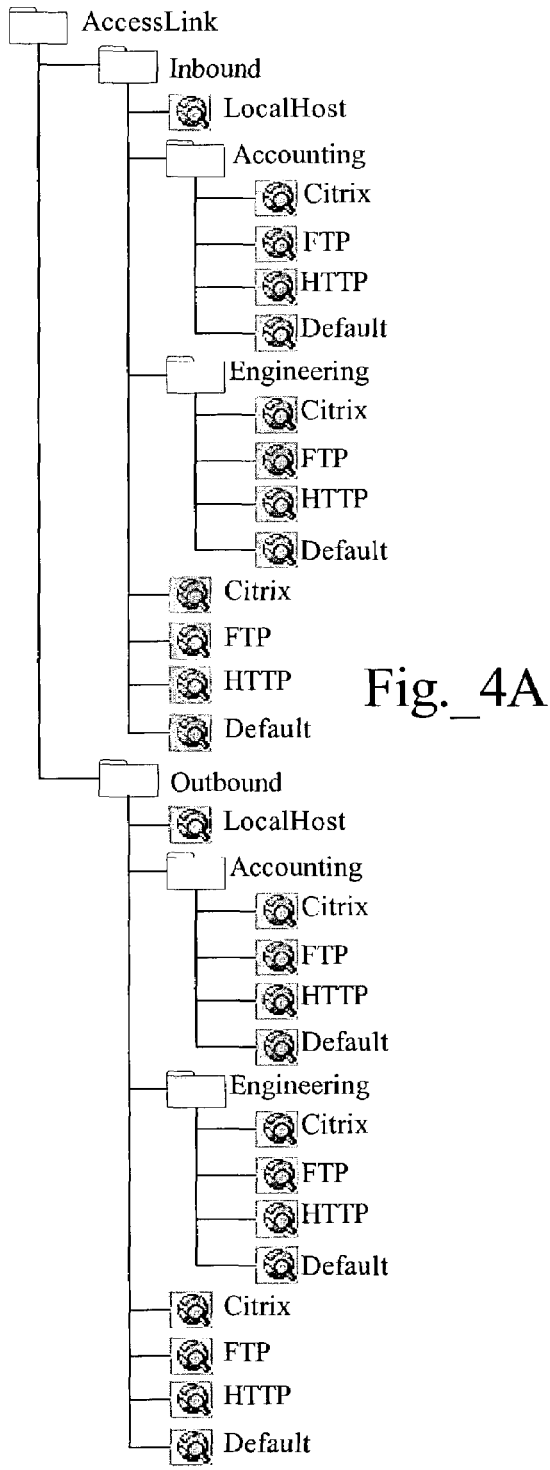
FIG. 4A is a diagram illustrating a traffic classification configuration for a given access link according to an embodiment of the present invention.

FIG. 1 sets forth a packet-based computer network environment including a bandwidth management device 30. As FIG. 1 shows, local area computer network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and local area network 40. Server 28 is a TCP end system connected to computer network 50 through router 26 and access link 25. Client devices 24 are additional TCP end systems operably connected to computer network 50 by any suitable means, such as through an Internet Services Provider (ISP). The computer network environment, including computer network 50 is a packet-based communications environment, employing TCP/IP protocols, and/or other suitable protocols, and has a plurality of interconnected digital packet transmission stations or routing nodes. Bandwidth management device 30 is provided between router 22 and local area computer network 40. Bandwidth management device 30 is operative to classify data flows and, depending on the classification, enforce respective bandwidth utilization controls on the data flows to control bandwidth utilization across and optimize network application performance across access link 21.

A. Bandwidth Management Device

FIG. 2 is a block diagram illustrating functionality, according to one embodiment of the present invention, included in bandwidth management device 30. In one embodiment, bandwidth management device 30 comprises packet processor 131, flow control module 132, measurement engine 140, traffic classification engine 137, management information base (MIB) 138, traffic classification analyzer 145, and administrator interface 150. Packet processor 131 is operative to detect new data flows and construct data structures including attributes characterizing the data flow. Flow control module 132 is operative to enforce bandwidth utilization controls on data flows traversing bandwidth management device 30. Traffic classification engine 137 is operative to analyze data flow attributes and identify traffic classes corresponding to the data flows, as discussed more fully below. In one embodiment, traffic classification engine 137 stores traffic classes associated with data flows encountered during operation of bandwidth management device 30, as well as manually created traffic classes and a hierarchical traffic class structure, if any, configured by a network administrator. In one embodiment, traffic classification engine 137 stores traffic classes, in association with pointers to bandwidth utilization controls or pointers to data structures defining such bandwidth utilization controls. Management information base 138 is a database of standard and extended network objects related to the operation of bandwidth management device 30. Measurement engine 140 maintains measurement data relating to operation of bandwidth management device 30 to allow for monitoring of bandwidth utilization across access link 21 with respect to a plurality of bandwidth utilization and other network statistics on an aggregate and/or pre-traffic-class level. Traffic classification analyzer 145 is operative to examine the efficiency of the traffic classification based on the current configuration of bandwidth management device based on information obtained from at least one of the management information base 138 and the measurement engine 140.

Administrator interface 150 facilitates the configuration of bandwidth management device 30 to adjust or change operational and configuration parameters associated with the device. For example, administrator interface 150 allows administrators to select identified traffic classes and associate them with bandwidth utilization controls, such as a partition, as well as other controls. Administrator interface 150 also displays various views associated with a hierarchical traffic classification scheme and allows administrators to configure or revise the hierarchical traffic classification scheme as discussed more fully below. Administrator interface 150 can be a command line interface or a graphical user interface accessible, for example, through a conventional browser on client device 42.

A.1. Packet Processing

In one embodiment, when packet processor 131 encounters a new data flow it stores the source and destination IP addresses contained in the packet headers in host database 134. Packet processor 131 further constructs a control block object including attributes characterizing a specific flow between two end systems. In one embodiment, packet processor 131 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Packet processor 131, in one embodiment, reserves memory space in the dynamic memory pool for storing such variably-sized attribute information as flows traverse bandwidth management device 30. Packet processor 131 writes the attributes in the dynamic memory pool and, if it runs out of memory, reports to the management information base that it ran out of memory and returns the service type ID (see below) identified at the point when memory ran out.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980, incorporated by reference herein, discloses classification of data flows for use in a packet-based communications environment. FIG. 1 illustrates the concept associated with inside and outside addresses. As discussed above, in one embodiment, a flow specification object includes an "inside" and "outside" address relative to bandwidth management device 30. See FIG. 1. For a TCP packet, packet processor 131 can compute the inside and outside addresses based on the source and destination addresses of the packet and the direction of the packet flow.

In one embodiment, packet processor 131 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 131 hashes the values identified above and scans the hash table for a matching entry. If one exists, packet processor 131 associates the pointer to the corresponding control block object with the data flow.

To allow for identification of service types (e.g., FTP, HTTP, etc.), packet processor 131, in one embodiment, is supported by one to a plurality of service identification tables in a relational database that allow for identification of a particular service type (e.g., application, protocol, etc.) based on the attributes of a particular data flow. In one embodiment, a service table including the following fields: 1) service ID, 2) service aggregate(if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When bandwidth management device 30 encounters a new flow, packet processor 131 analyzes the data flow against the service attributes in the service table to identify a service ID corresponding to the flow. In one embodiment, packet processor 131 may identify more than one service ID associated with the flow. In this instance, packet processor 131 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor associates the flow with the most specific service ID. A traffic class may be configured to include matching rules based on the service IDs in the services table. For example, a matching rule directed to HTTP traffic may simply refer to the corresponding service ID, as opposed to the individual attributes that packet processor 131 uses to initially identify the service.

In one embodiment, when packet processor 131 inspects a flow it may detect information relating to a second, subsequent flow (e.g., an initial FTP command connection being the harbinger of a subsequent data connection, etc.). Packet processor 131, in response to such flows populates a remembrance table with attributes gleaned from the first flow, such as IP addresses of the connection end points, port numbers, and the like. Packet processor 131 scans attributes of subsequent flows against the remembrance table to potentially associate the subsequent flow with the first flow and to assist in identification of the second flow.

A.2. Flow Control Module

As discussed above, flow control module 132 enforces bandwidth utilization controls (and, in some embodiments, other policies) on data flows traversing access link 21. A bandwidth utilization control for a particular data flow can comprise an aggregate control bandwidth utilization control, a per-flow bandwidth utilization control, or a combination of the two. Flow control module 132 can use any suitable functionality to enforce bandwidth utilization controls known in the art, including, but not limited to weighted fair queuing, class-based weighted fair queuing, Committed Access Rate (CAR) and "leaky bucket" techniques. Flow control module 132 may incorporate any or a subset of the TCP rate control functionality described in the cross-referenced U.S. patents and/or patent applications set forth above for controlling the rate of data flows. Bandwidth management device 30, however, can also be configured to implement a variety of different policy types, such as security policies, admission control policies, marking (diffserv, VLAN, etc.) policies redirection policies, caching policies, transcoding policies, and network address translation (NAT) policies. Of course, one of ordinary skill in the art will recognize that other policy types can be incorporated into embodiments of the present invention.

A.2.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy-that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

A.2.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

A.3. Traffic Classification

A traffic class comprises a set of matching rules or attributes allowing for logical grouping of data flows that share the same characteristics or set of characteristics—e.g., a service ID or type (see Section A.1., above), a specific application, protocol, IP address, MAC address, port, subnet, etc. In one embodiment, each traffic class has at least one attribute defining the criterion (ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. No. 6,412,000 and U.S. patent application Ser. No. 10/039,992 describe some of the data flow attributes that may be used to define a traffic class, as well as the use of hierarchical classification structures to associate traffic classes to data flows. In one embodiment, bandwidth management device 30 includes functionality allowing for classification of network traffic based on information from layers 2 to 7 of the OSI reference model.

In one embodiment, bandwidth management device 30 is configured to include a predefined set of traffic classes based upon a knowledge base gleaned from observation of common or known traffic types on current networks. Bandwidth management device 30, in one embodiment, also allows an administrator to manually create a traffic class by specifying a set of matching attributes. Administrator interface 150, in one embodiment, allows for selection of a traffic class and the configuration of bandwidth utilization (e.g., partition, policy, etc.) and/or other controls/policies (e.g., redirection, security, access control, etc.) for the selected traffic class. As discussed below, administrator interface 150 also allows for the selection and arrangement of traffic classes into hierarchical reference trees (see FIG. 4A).

Traffic classification database 137 stores traffic classes associated with data flows that traverse access link 21. Traffic classification database 137, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configure to define a particular user group or subnet, while additional child traffic classes can be configured to identify specific application traffic associated with the user group or subnet.

In one embodiment, the root traffic classifications are "/inbound" and "/outbound" data flows. Any data flow not explicitly classified as "/inbound/default/" or "/outbound/default/". In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree, such as the hierarchical directory-file structure depicted in FIGS. 4A and 4B. Bandwidth management device 30 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification database 137 implements the reference tree classification model wherein separate traffic classification trees can be embedded in traffic class nodes of a given traffic classification tree. U.S. Application Ser. No. 10/236,149, incorporated by reference herein, discloses the use and implementation of embeddable reference trees.

Figure 4B:
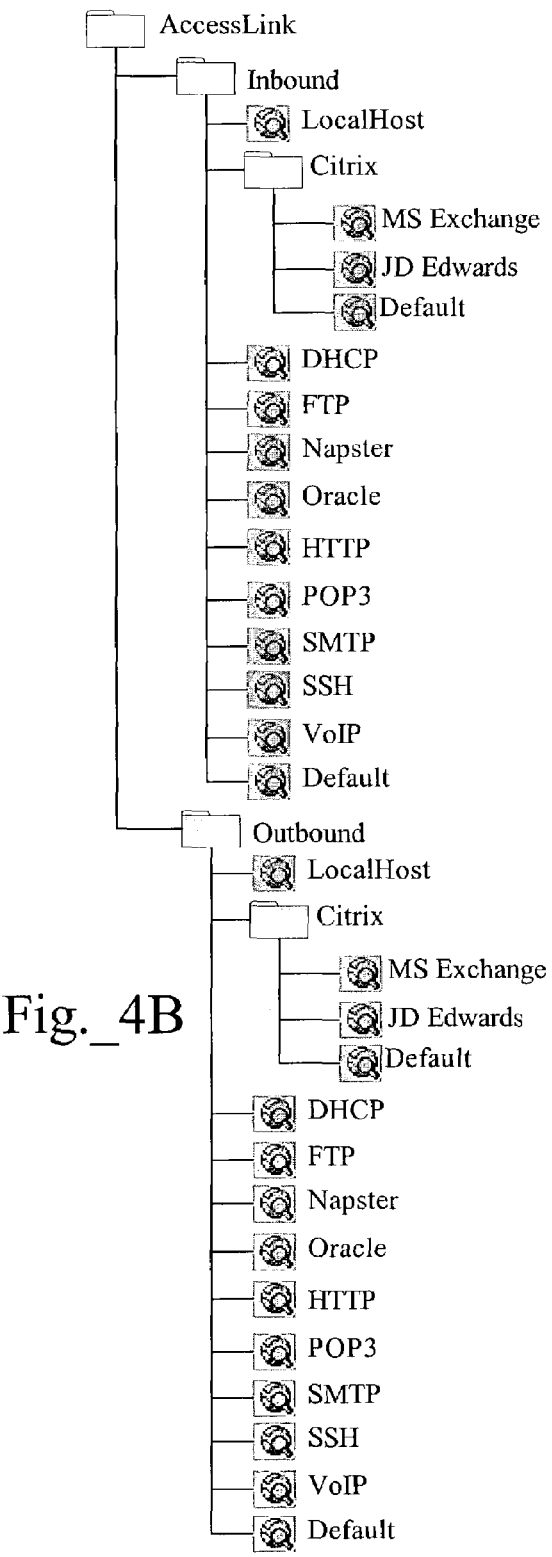
FIG. 4B is a diagram illustrating a traffic classification configuration for a given access link according to another embodiment of the present invention.

FIGS. 4A and 4B illustrate two possible traffic classification configurations, according to embodiments of the present invention, which may be implemented by bandwidth management device 30. FIG. 4A sets forth a traffic classification configuration oriented around user groups (e.g., accounting, engineering) defined, in one embodiment, by subnets or simply a list of IP addresses. At a lower level, traffic is further matched based on application or protocol. FIG. 4B provides a traffic classification configuration oriented around applications. As discussed above, traffic classification database 137, in one embodiment, is configured to traverse the hierarchical traffic classification tree, applying the matching rules associated with each traffic class node, in the order in which they are configured. In one embodiment, traffic classification database 137 attempts to match to a leaf traffic class node before proceeding to remaining traffic class nodes in the hierarchical configuration. If a traffic class is found, the traffic classification database 137 stops the instant search process and returns the identified traffic classification. The "LocalHost" traffic class corresponds to data flows destined for bandwidth management device 30, such as requests for stored measurement data or device configuration changes. Of course, one skilled in the art will recognize that alternative ways for traversing the hierarchical traffic class configuration can be implemented. For example, traffic classification database 137 may be configured to traverse all traffic class nodes at a given level before proceeding to lower levels of the traffic classification tree. If more than one traffic class matches the data flow, traffic classification database 137 can be configured with rules or other logic to select from one of the matching traffic classes.

A.3.a. Traffic Type Identification and Automatic Traffic Classification

In one embodiment, bandwidth management device 30 further comprises a traffic discovery engine (not shown), which is operative to apply predefined sets of matching criteria to identify a traffic type associated with data flows traversing bandwidth management device 30. In one embodiment, the traffic discovery engine creates traffic classes automatically in response to data flows traversing bandwidth management device 30 and stores such traffic classes in traffic classification engine 137. Automatic traffic classification is disclosed in U.S. Pat. No. 6,412,000, which is incorporated herein by reference. In one embodiment, the traffic discovery engine must detect a minimum number of data flows within a predefined period for a given traffic type before it creates a traffic class in traffic classification engine 137. In one embodiment, such discovered traffic classes are, by default, attached to or associated with a shared "auto-discovered" reference tree, as appropriate. As discussed below, administrator interface 150 allows for configuration of bandwidth controls for auto-discovered traffic classes. In one embodiment, auto-discovered traffic classes are automatically assigned predefined or default bandwidth utilization controls. U.S. patnet application Ser. No. 09/198,051, incorporated by reference herein, discloses automatic assignment of bandwidth utilization controls for discovered traffic classes.

The traffic discovery engine, in one embodiment, is supported by one to a plurality of traffic identification tables in a relational database that allows for identification of a traffic type (e.g., application, service, protocol, etc.) based on the attributes of a particular data flow. In one embodiment, the traffic discovery engine includes a services table including the following fields: 1) service ID, 2) service aggregate(if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When bandwidth management device 30 encounters a new flow, the traffic discovery engine analyzes the control block object associated with the data flow against the service attributes in the services table to identify a service ID corresponding to the flow. In one embodiment, the traffic discovery engine may identify more than one service ID associated with the flow. In this instance, traffic discovery engine associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, the traffic discovery engine associates the flow with the most specific service ID.

As discussed above, if the traffic discovery engine identifies a threshold number of flows for a given service for which no traffic class has been configured, it will create a traffic class corresponding to the service type in the traffic classification configuration hierarchy maintained in traffic classification engine 137. In one embodiment, the traffic discovery engine constructs a set of matching rules based on the corresponding service attributes in the service table (and/or other tables associated with the service ID) and stores them in association with a traffic class identification. In one embodiment, the traffic discovery engine further stores the default bandwidth management policy associated with the service ID in association with the traffic class node. In one embodiment, administrator interface 150 allows a user to select a discovered traffic class node, and add it to another location in the existing traffic classification tree.

A.4. Measurement Engine and Management Information Base

Measurement engine 140 and management information base 138 maintain, among other things, data characterizing aspects of the operation of traffic classification database 137 to allow for an analysis of the performance of the traffic classification configuration associated with bandwidth management device 30.

Measurement engine 140 maintains data associated with the operation of bandwidth management device 30 and access link 21, including data allowing for measurement of bandwidth utilization across access link 21 with respect to a plurality of bandwidth utilization and other network statistics. For example, measurement engine 140 monitors the number of inbound and outbound packets, as well as the number of bytes, traversing bandwidth management device 30 on an aggregate (access link), partition, and/or traffic class level. Other network statistics can include the number of TCP packets, the number of retransmitted TCP packets, the peak number of active TCP flows or other connections, etc. Measurement engine 140 also maintains data relating to operation of bandwidth management device 30, such as the number of partitions, the byte count in a given partition, the packet count in a given partition, the TCP data packet count in a given partition, the TCP retransmit packet count in a given partition, the TCP tossed retransmit packet count in a given partition, the peak number of active TCP flows in the partition, the total time in seconds spent over the partition size for the partition, as well as counts relating to traffic classification, such as the number of times a given traffic class has been matched to a data flow, etc. Measurement engine 140 further maintains data relating to traffic classes, such as, for a given traffic class: the packet count in the traffic class, the TCP data packet count in the class, the TCP retransmit packet count in the class, and the peak number of active TCP flows in the class. Of course, measurement engine 140 can be configured to record and maintain a variety of network utilization and performance related data.

In one embodiment, measurement engine 140 monitors operation of bandwidth management device 30 and maintains values (e.g., packet counts, peak bandwidth utilization values, and other quantities) for various network operation, utilization and performance statistics. In one embodiment, measurement engine 140 maintains such values in volatile memory and, at periodic intervals, stores the data in persistent memory, such as a hard drive, with a time stamp and clears the network statistic values in the volatile memory space. As discussed above, network statistic data can be stored in association with identifiers for access link 21, as well as for various partitions and traffic classes associated with the current configuration of bandwidth management device 30. In one embodiment, measurement engine 140 stores network statistic data in persistent memory at one-minute intervals, in association with corresponding time stamps; however, other suitable time intervals can be chosen as a matter of engineering design or administrative need. In one embodiment, the time interval at which measurement engine 140 stores network management data in persistent memory is a configurable parameter. In addition, the persistent memory, in one embodiment, includes sufficient capacity to store a large amount of network management data, such as data for a period of 24, 48, or 72 hours. Additionally, measurement engine 140, in one embodiment, includes APIs traffic classification analysis objects, executed in an embedded runtime environment (for example) or in the native runtime environment, access to raw measurement data. In one embodiment, measurement engine 140 includes APIs and associated functionality that aggregates raw measurement data over specified time intervals (e.g., the last hour, 15 minutes, day, etc.).

Management information base 138 maintains a database of standard and extended network objects maintaining counts and other statistics relating to the operation of bandwidth management device 30. In one embodiment, the data maintained by management information base 138 can be extracted using Simple Network Management Protocol (SNMP) queries. In one embodiment, management information base 138 is maintained in dynamic memory, such as Random Access Memory. For example, the management information base 138 maintains counts related to the operation of the inside and outside network interfaces associated with the bandwidth management device 30, such as the number of bytes transmitted from an interface, the number of bytes received on an interface, the number of queued packets, transmission error counts, etc. Management information base 138 also maintains counts related to the operation of different modules (e.g., packet processor 131, flow control module 132, etc.) included in bandwidth management device 30.

A.5. Traffic Classification Analyzer

Traffic classification analyzer 145 is operative to examine the performance of a given traffic classification configuration, as discussed more fully below. Traffic classification analyzer 145, in one embodiment, operates on data collected by one or both of management information base 138 and measurement engine 140. In one embodiment, traffic classification analyzer does not run on the packet/data flow path, where it has real-time access to packet/flow data. As discussed herein, raw data associated with the data flows are recorded, traffic classification analyzer then operates on the recorded raw data in a different, lower-priority process than the packet processing and flow control processes described above. A less time-constrained process, such as a Java or Python script or a plug-in, can examine the data maintained by management information base 138 and/or measurement engine 140 and evaluate the performance of a given traffic classification configuration. In another embodiment, however, traffic classification analyzer 145 may run in the same task as the functionality of packet processor 131, especially if the traffic classification analysis methodology is computationally inexpensive.

In one embodiment, traffic classification analyzer 145 includes a demon that, when invoked, writes data maintained by management information base 138, and used by traffic classification analyzer 145, to a text or other file in persistent memory. In one embodiment, the demon maintains a list of the MIB objects traffic classification analyzer 145 uses to analyze the performance of traffic classification configurations. This list may be updated as the functionality of the traffic classification analyzer 145 is modified. The demon may be configured to execute in response to a variety of conditions. For example, the demon may be configured to execute on a periodic basis (e.g., every 5 minutes, every quarter-hour, etc.). The demon may also be invoked upon the receipt of a command request from a remote device. A network administrator may also expressly invoke the demon via administrator interface 150 to calculate the current performance of the traffic classification configuration associated with bandwidth management device 30.

Bandwidth management device 30, in one embodiment, features a plug-in architecture that facilitates, among other things, updates to the traffic classification analyzer 145 (as well as other) functionality. A plug-in can contain data that extends and/or modifies one or more tables or data structures used by traffic classification analyzer 145 and/or updated code. Traffic classification analyzer 145, in one embodiment, uses a shared (dynamic link) library loader to add analysis plug-ins to an existing software release during a boot sequence. The shared library loader, in one embodiment, is operative to determine whether any plug-ins exist (e.g., by checking a directory or other reserved file space), and to extend/modify tables or other data structures and/or register specific code as required.

In another embodiment, bandwidth management device 30 can be configured to include an embedded runtime environment (not shown) that is operative to execute traffic classification analysis scripts installed on bandwidth management device 30. Such an embodiment allows network administrators and others to create custom traffic classification analysis scripts tailored to a vast array of requirements, conditions and goals. In one embodiment, the embedded runtime environment is an object-oriented runtime environment, such as Python or Java®. The embedded runtime environment may be configured to include a runtime interpreter that interprets and executes scripts in source code form. In another embodiment, the embedded runtime environment may be configured to execute compiled traffic classification analysis scripts. In one such embodiment, the embedded runtime environment may include just-in-time compiler functionality to compile source code scripts into object or byte code form before execution. As discussed more fully below, bandwidth management device 30 stores one or more traffic classification analysis scripts operative to yield a score or other indication of the efficiency of a given traffic classification configuration. In one embodiment, traffic classification analysis scripts are implemented as traffic classification analysis objects, which are instantiations of traffic classification analysis classes. In one embodiment, traffic classification analysis objects can be instantiated for each bandwidth management device 30 and maintained on a central management server (see below), wherein the state of the traffic classification analysis object can be pickled after execution, or after a threshold period of inactivity, to allow for certain data related to traffic classification analysis to persist. U.S. Application Ser. No. 10/178,617, incorporated by reference herein, discloses the incorporation of embedded runtime environments into bandwidth management devices and the pickling of objects to persist data and variables. In another embodiment, traffic classification analysis objects can be instantiated for each network interface associated with bandwidth management device 30, such as a separate traffic classification analysis object for /inbound and /outbound network traffic.

A.6. Centrally Deployed Traffic Classification Analyzer

Figure 5:
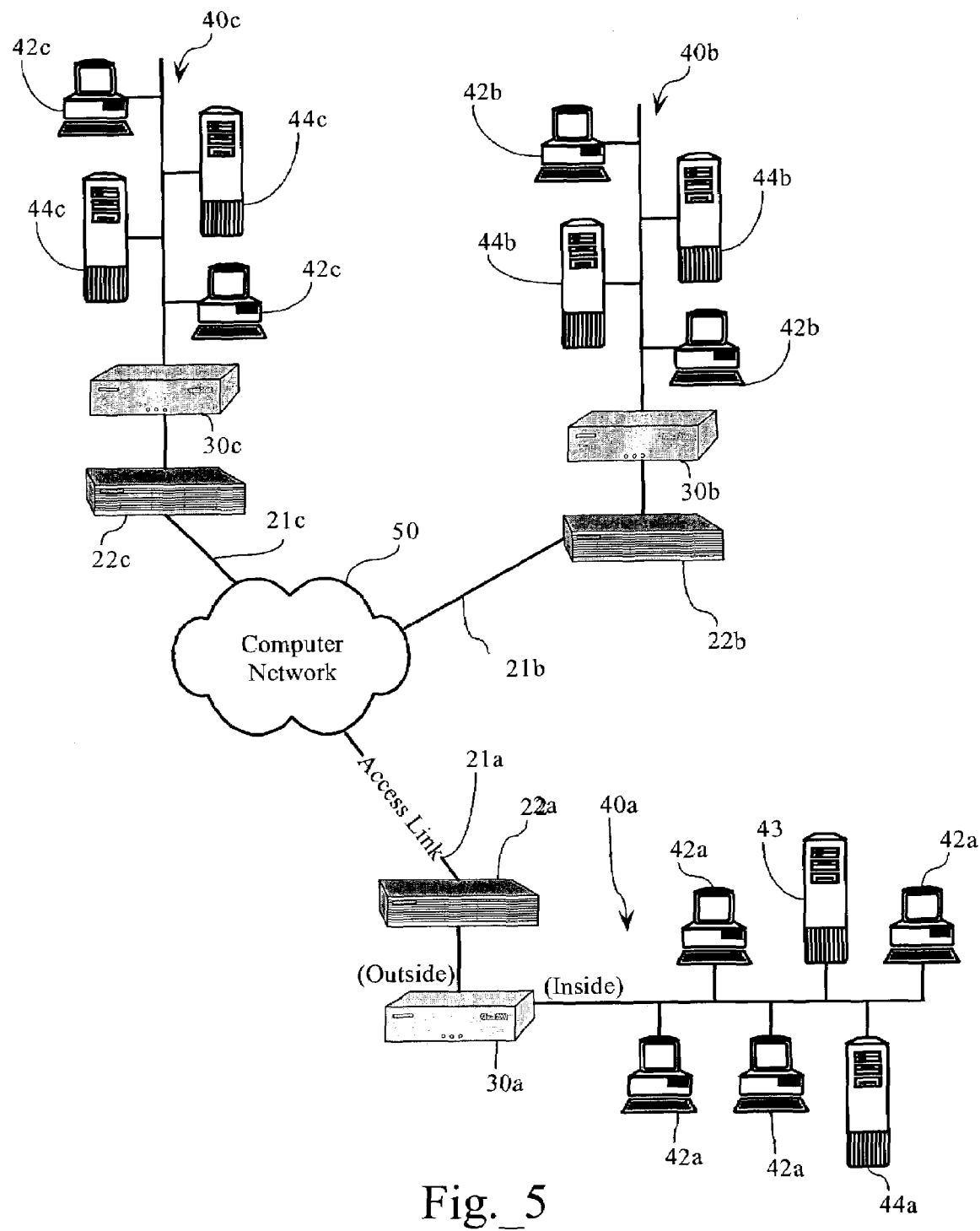
FIG. 5 is a functional block diagram providing a computer network environment including a plurality of bandwidth management devices and a central management server.

FIG. 5 illustrates a packet-based computer network environment including bandwidth management devices 30*a*, 30*b*, and 30*c*. As FIG. 5 shows, local area computer networks 40*a*, 40*b*, and 40*c* each interconnect several TCP/IP end systems, including client devices 42*a*, 42*b*, and 42*c* and server devices 44*a*, 44*b*, and 44*c*, and provide access to resources operably connected to computer network 50 via routers 22*a*, 22*b*, and 22*c* and access links 21*a*, 21*b*, and 21*c*, respectively. Use of the letters "a", "b", and "c" after various reference numbers is intended to clarify the associations between particular local area network (40*a*, 40*b*, and 40*c*) and the nodes connected thereto. For purposes of description, the use of a reference number herein without a letter designation is intended to apply to all corresponding devices; for example, the term "bandwidth management device 30" is intended to encompass bandwidth management devices 30*a*, 30*b*, and 30*c*.

As FIG. 5 shows, computer network 40*a* further comprises network management server 43 operative to extract network statistic or device performance data from network devices associated therewith, as more fully described below. In one embodiment, network management server 43 hosts a network management application operative to poll network devices for measurement data, such as ReportCenter™ (offered by Packeteer, Inc. of Cupertino, Calif.) which is operative to extract measurement data from a plurality of PacketShaper® bandwidth management devices. As discussed more fully below, network management server 43 can be configured to poll bandwidth management devices 30*a*, 30*b*, and 30*c*, and/or other network devices, such as server 44*b* or 44*c*, for example, for measurement and/or performance analysis data.

In one embodiment, network management server 43 extracts or receives the data maintained by measurement engine 140 and/or management information base 138 to allow a network traffic analyzer resident on network management server to analyze the performance of network traffic classification configurations associated with a plurality of centrally managed bandwidth management devices 30*a*, 30*b* and 30*c*. Co-pending Application Ser. No. 10/104,238, incorporated by reference herein, describes the extraction of data, especially lazy data collection methods, from one or more bandwidth management device 30. Measurement engine 140, in one embodiment, includes HTTP server functionality operative to handle requests for measurement data from remote devices operably connected to computer network 50. In one embodiment, measurement engine 140 implements an Application Programming Interface (API) based on XML and HTTP, allowing for a broad range of queries against network utilization and performance data maintained by bandwidth management device 30. For example, using the APIs specified by a Document Type Definition (DTD) and supported by measurement engine 140, a network management application can transmit an XML request to retrieve measured and MIB data relating to access link 21, and any traffic class or partition associated with the current configuration of bandwidth management device 30. In one embodiment, measurement engine 140 supports one to a combination of the following output formats: 1) comma-separated-values (CSV) format, 2) tab-separated values (TSV), or 3) various XML formats. Measurement engine 140 is operative to handle queries relating to any set of measurement variables supported by bandwidth management device 30. In addition, measurement engine 140 allows measurement data to be retrieved for a given time interval between two specified times (as long as that data still exists in persistent memory on bandwidth management device 30).

II. Operation

A. Enforcement of Bandwidth Utilization Controls

FIG. 3 illustrates a method, according to one embodiment, directed to the enforcement of bandwidth utilization controls on data flows transmitted across access link 21 and, therefore, traversing bandwidth management device 30. The method for enforcing bandwidth utilization controls, however, is not critical to the present invention; any suitable method can be employed. In one embodiment, packet processor 131 receives a data packet (FIG. 3, step 202) and determines whether the packet is part of a new data flow (step 204) or represent a change to an existing data flow (see steps 218 and 220). Methods for determining new data flows and assigning packets to existing data flows are well known in the art and also depend on the particular transport layer protocol employed. For a TCP packet, packet processor 131 can determine a new data flow by detecting SYN and/or SYN/ACK packets. However, a new data flow can simply be a data flow for which there is no corresponding control block object in flow database 135. In some embodiments, packet processor 131 may have to encounter multiple packets to identify and fully characterize a new data flow (e.g., identify a service type, traffic class, etc.). For example, U.S. Pat. No. 6,046,980, identified above, discloses methods for classifying packet network flows.

If the packet is a new data flow, packet processor 131 constructs a control block object including attributes characterizing the data flow, such as service type, etc. (step 212) (see above). Otherwise, packet processor 131 determines whether flow database 135 contains an existing control block object corresponding to the data flow (step 208) (see Section A.1., supra). If so, packet processor 131 retrieves the control block object, updates various attributes (e.g., last packet time, etc.), and associates the packet with the control block object (step 218). If flow database 135 does not contain a control block object associated with the new data flow, packet processor 131 constructs a control block object as discussed herein (step 212). In one embodiment, packet processor 131 analyzes the source and destination IP addresses in the packet header and scans host database 134 for matching entries. If no matching entries exist, packet processor 131 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, service type, protocol type, pointers to variable-length information in the dynamic memory pool, and other parameters characterizing the data flow.

If the packet corresponds to an existing data flow, packet processor 131 retrieves the control block object and updates attributes of the control block object and/or flow specification object as appropriate (step 218). If elements of the data packet represent a change to the traffic type associated with the data flow (step 220), packet processor 131 passes the flow specification object to traffic classification engine 137 to identify a traffic class corresponding to the flow (step 214). Methods for determining changes to data flows are also well known in the art. For example, an email may include an attached digital image file. Accordingly, while the initial packets in the data flow may include simple text data, subsequent packets may contain image data. Packet processor 131, in one embodiment, is operative to detect such changes in the characteristics of the data flow by examining data encapsulated in upper layers of each packet, such as the detection of MIME types, etc.

As discussed above, to identify a traffic class associated with data flow, packet processor 131 passes the control block object (or a pointer to the control block object) to traffic classification engine 137. In one embodiment, the control block object or a copy of it is stored in association with the packet and in the same buffer structure to facilitate access to the control block object by traffic classification engine 137. As discussed in more detail below, traffic classification engine 137 operates on attributes of the control block object and/or flow specification object to identify traffic class(es) associated with the data flow (step 214). In one embodiment, the control block object in flow database 135 includes a pointer to the identified traffic class(es) in traffic classification engine 137. In one embodiment, the traffic classification engine 137 stores in the control block object the policy parameters (e.g., bandwidth utilization control parameters, security policies, etc.) associated with the identified traffic classes.

Rate control module 132 then accesses the control block object corresponding to the data flow to retrieve the bandwidth utilization or other controls (e.g., partition, policy, security controls, etc.) associated with the traffic class (step 216) and enforces the bandwidth utilization controls on the data packet flow (step 222). As discussed above, the particular packet flow control mechanism employed is not critical to the present invention. A variety of flow control technologies can be used, such as the flow control technologies disclosed in co-pending and commonly owned application Ser. No. 10/108,085, incorporated herein by reference above, as well as other ate control technologies. In addition, measurement engine 140 records data associated with the packet (step 224) to allow for analysis of bandwidth utilization and other network statistics on a traffic class, access link, and/or partition level.

B. Analysis of Traffic Classification Configuration

As discussed above, management information base 138 and measurement engine 140 maintain data characterizing the operation of bandwidth management device 30, including operation of the inspection and processing functions of packet processor 131 and the matching operations of traffic classification database 137. Table 1, below, provides a list of variables maintained by management information base 138 and/or measurement engine 140 that may be used in analyzing the performance of a traffic classification configuration. As one skilled in the art will recognize, however, the variables set forth in Table 1 are for illustrative purposes only and that other variable types may be employed in the analysis of traffic classification performance.

TABLE 1

| Variable Identifier Inspection | Description |
| --- | --- |
| MIB variables | |
| protocolScans | Number of times that a data structure containing Network and Transport Layer protocol information (e.g., UDP, TCP, ICMP, IGP, BGP) is consulted. |

TABLE 1-continued

| Variable Identifier Inspection | Description |
| --- | --- |
| rememberHits | Number of times the packet processor accessed the remembrance table (see Section I.A.1, supra) and found a match. |
| rememberMisses | Number of times the packet processor accessed the remembrance table and did not find a match. |
| lowmemLessSpec | Number of times a flow was classified less specifically because the dynamic memory pool was exhausted. |
| Measurement Engine Data | |
| Appness-allocs | The number of allocations of the dynamic memory pool related to containing application information. |
| first-looks | Number of times the packet processor examines the first packet of a flow in order to determine the service type. |
| Other-looks | Number of times the packet processor examines subsequent packets in a flow to determine a service type. After the first look, there are three possibilities: 1) it is determined from looking at the first packet that the flow being examined has this service type; 2) it is determined from looking at the first packet that the flow being examined is not this service type; and 3) it is determined from looking at the first packet that the examination of subsequent packets of this flow may result in the identification of the flow as this service type. In case 3), the packet processor flags the flow and performs a second service type lookup upon encountering the second packet in the flow. |
| Classification MIB variables | |
| flowMoreSpec | Number of times that a flow was re-classified in a more specific traffic class. |
| classMatch | Number of times a flow was matched to a traffic class. |
| classNoMatch | Number of times a flow was compared to a traffic class and did not match. |
| ruleMatch | Number of times a matching rule was met. |
| ruleNoMatch | Number of times a matching rule was not met. |
| classCount | Total number of traffic classes in the traffic classification configuration. |
| ruleCount | Total number of matching rules in the traffic classification configuration. |
| criteriaMatch | Number of times a data string in the dynamic memory pool matched a rule in a traffic class. |
| criteriaNoMatch | Number of times a data string in the dynamic memory pool did not match a rule in a traffic class. |
| Measurement Engine Data | |
| class-hits | Total number of times a traffic class was matched to a flow (in one embodiment, only counted at leaf nodes). |
| policy-hits | Total number of times that a policy was put into effect for a flow matching a corresponding traffic class. |
| class-checks | Number of times the traffic classification database was accessed to classify a flow. |

As discussed above, traffic classification analyzer 145, in one embodiment, analyzes the performance of traffic classification database 137 and, in one embodiment, computes a score indicating the efficiency or other performance criteria associated with the traffic classification maintained by the traffic classification database. The score computed by traffic classification analyzer 145 may take a variety of forms. For example, the score may be a numerical value within a predetermined range (e.g., 0 to 100, where 0 indicates an inefficient or cumbersome traffic classification configuration, or vice versa), or a alphanumeric rating (e.g., A, B, C, etc.), or even a more binary Bad or Good rating. As discussed above, traffic classification analyzer 145 may use the variables set forth in Table 1 maintained by management information base 138 and measurement engine 140.

Traffic classification analyzer 145, in one embodiment, determines the efficiency of a given network traffic classification configuration by comparing the number of successful traffic class matches and matching rule comparisons versus the number of failed traffic class and matching rule comparisons, incidence of using one of the optimized paths in the traffic classifier, and various other heuristics and methods. The result is that bandwidth management device 30 can indicate in a user interface whether the current traffic classification is working "well" or "poorly"—perhaps a score, saying the tree is working at 100% efficiency (green) or 10% efficiency (red)—and, as discussed below, can suggest improvements to the traffic classification configuration. The classification load metrics can also be recorded in the measurement engine 140 and compared over time to other measurements.

For didactic purposes, as a convention, a performance efficiency score of 0 is the worst number (0% "efficient") and 100 is the best number (100% "efficient"). As one skilled in the art will recognize, the opposite convention can be used such that low numbers correspond to "low load" and high numbers to be "high load." In one embodiment, traffic classification analyzer 145 computes a separate performance efficiency score for the /Inbound and /Outbound portions of the traffic classification configuration. The performance efficiency score can be recalculated with low or high frequency and at varying or fixed intervals. For example, traffic classification analyzer 145 can be configured to recalculate the performance efficiency score as often as a flow is classified (in one embodiment, every tclassCheck() (class-check) on an actual flow.) In another embodiment, traffic classification analyzer 145 may evaluate the performance efficiency score every N times a flow is classified, or at a fixed time interval (e.g., every ten seconds, one minute, one hour, etc.).

Traffic classification analyzer 145 can also be configured to examine the efficiency of the current time classification configuration on a static and/or a dynamic (runtime) basis. For example, traffic classification analyzer 145 can be configured to analyze the runtime performance of the current traffic classification configuration by evaluating how difficult the actual network traffic was to classify. The variables discussed above maintained by measurement engine 140 and/or management information base 138 can be used in such an examination. In one embodiment, traffic classification analyzer 145 stores the resulting performance efficiency scores in association with a time stamp to allow for an asseseement of how the score changes or drifts as time progresses and the nature of the network traffic that traverses bandwidth management device 30 changes. In addition, traffic classification analyzer 145 can perform a static performance analysis by running a representative sample of network traffic through the traffic classification configuration and calculating a performance efficiency score. A representative sample of network traffic, in one embodiment, may be derived from actual network traffic sampled at periodic intervals during runtime and stored in a persistent memory, such as a hard disk drive (for example one second of traffic taken every hour, or the first 5 packets out of the flow for one out of every thousand flows, etc.). In one embodiment, packet processor 131 includes a "packet logger" mechanism that records packets to a buffer as they are received. In one embodiment, a background process, in one embodiment, goes through the buffers in memory and saves the packets, or a sample of the packets, to persistent memory, such as a hard disk.

In one embodiment, traffic classification analyzer 145 is implemented as a software module executing in the native or other runtime environment. In one embodiment, the performance efficiency score can be calculated either: a) using hard-coded algorithms that are built into the software implementing traffic classification analyzer 145, or b) the functionality of traffic classification analyzer can be embodied in a plug-in that is pre-installed on bandwidth management device 30, downloadable from a remote web site, and/or custom-written by the user, such as a network administrator, to tune the calculation of the score to the factors about which the user is most concerned.

As a didactic example, traffic classification analyzer 145 may assess the performance efficiency of the current traffic classification configuration by comparing the total number of observed matching rule comparisons to the total number of theoretically possible matching rules comparisons based on the current traffic classification configuration and the number of data flows traversing bandwidth management device 30. For example, as discussed above, management information base 138 keeps a running count of the number of failed matching rule comparisons (ruleNoMatch) and the number of successful matching rule comparisons (ruleMatch), while measurement engine 140, in one embodiment, maintains the total number of times any flow is checked against the traffic classification configuration (class-check). In addition, the total number of matching rules in the current traffic classification configuration (rule-Count) is also available.

In a dynamic analysis mode, traffic classification analyzer 145 accesses the statistics maintained by management information base 138 (and, potentially, data saved to persistent memory as discussed above), and measurement engine 140 to calculate a performance efficiency score. In addition, since such statistics can be time stamped, traffic classification analyzer can calculate a performance efficiency score for a specified period of time. In a static analysis mode, traffic classification analyzer 145 runs a representative sample of network traffic against the current traffic classification configuration, traversing the current traffic classification in a normal manner and maintaining the statistics discussed above. Specifically, for each traffic class encountered, traffic classification analyzer iterates through the list of matching rules for the traffic class. If the flow matches the rule, the "ruleMatch" counter is incremented, the "ruleMatch" counter is incremented. The total number of rules that theoretically could have been traversed to match the flows is class-check multiplied by ruleCount, while the total number of rules that were actually applied is ruleMatch plus ruleNoMatch. The percentage of the total number of rules that were actually applied vs. the theoretical maximum is:

$$100 * ((ruleMatch+ruleNoMatch)/(ruleMatch * ruleCount))$$

An "efficiency score" derived from this percentage, in one embodiment, can be:

$$100-(100 * ((ruleMatch+ruleNoMatch)/(ruleMatch * ruleCount))).$$

Note that with this particular efficiency calculation methodology, if traffic classes and/or matching rules are added to or removed from the current traffic classification configuration, the statistical counters discussed above should be reset since the values correspond to conditions that no longer hold. In addition, as one skilled in the art will recognize, a variety of factors can be employed to compute a performance efficiency store. For example, the matching rules may be weighted based on the central processing unit (cpu) time and/or memory is consumed to apply a particular matching rule. For example, a variant of the efficiency calculation methodology discussed above is to weight the matching rules with a number of "points" for how much cpu time or memory it takes to match on that particular matching rule type, and keeps sums of the total number of points in the traffic classification configuration and the total number of points incurred by applying the matching rules, and calculating the ratio of points. In certain embodiments, a weighted approach provides a more accurate "load" measure (since it may be computationally cheaper to apply a plurality of simple matching rules than one very complicated one that involves a lot of string or regular expression compares against a URL, for example).

As discussed above, traffic classification analyzer 145 can also be implemented as a plug-in or as a script executed in an embedded runtime environment, such as the Java® or Python® runtime environments. Provided below is a pseudo-code representation of a efficiency performance scoring plug-in or script. In one embodiment, the plug-in or script implements the following interface:

```
interface TrafficTreeMeter {
    // may contain various private variables to hold state
    // also, methods here are allowed to query the Measurement Engine (ME)
    // and look at mib variables. The constructor of this class may include code
    // which adds a new ME or mib variable, for example.
    // this function gets invoked whenever a matching rule matches
    void match_succeeded(matching_rule traffic_class flow_spec);
    // this gets invoked when a match fails
    void match_failed(matching_rule traffic_class, flow_spec);
    // this gets invoked when a flow is compared to the traffic classification scheme
    void check_started(flow_spec);
    // this gets invoked when comparing a flow to the traffic classification scheme ceases
    void check_ended(flow_spec);
    // this gets invoked when someone requests the score of the traffic classification
```

```
config.
        int evaluate( );
        // this gets invoked for each traffic class when the traffic classification config is
changed, can
        // be used to (re) count things in the tree
        void for_each_configure_class(traffic_class);
        // this gets invoked for each matching rule
        void for_each_configured_matching_rule(matching_rule)
    {
Therefore, a plug-in or script to calculate load or performance efficiency based on
the number of string compares, expressed in pseudo-code, may be:
        int total_urls_in_tree;
        int url_compares;
        // here, just want to know if a string compare on a URL was
        // performed, regardless whether it matched or failed
        void match_occurred(matching_rule, traffic_class, flow_spec) {
            if (!empty(matching_rule->url))
                url_compares++;
        }
        void match_succeeded( . . . ) {
            match_occurred( . . . );
        }
        void match_failed( . . . ) {
            match_occurred( . . . );
        }
        int evaluate( ) {
            return 100 - (100 * url_compares / (total_urls_in_tree * ruleMatch)));
        }
        void for_each_configured_matching_rule(matching_rule) {
            if (!empty(matching_rule->url))
                total_urls_in_tree++;
        }
```

B.1. Traffic Classification Configuration Wizard

In one embodiment, the traffic classification analysis functionality also includes a traffic classification configuration wizard that assists users to improve the performance efficiency of a network traffic classification configuration resident on a bandwidth management device 30. The traffic classification configuration wizard, in one embodiment, examines possible actions that can be taken (e.g., eliminating a traffic class, changing/deleting a matching rule, etc.), and produces a list of proposed changes to the current traffic classification configuration, and an estimate of the effect of that change on the performance score associated with the resulting traffic classification configuration.

In one embodiment and for didactic purposes, the performance efficiency score is an efficiency number where higher values indicate better efficiency. For example, a score of 10 indicates that the traffic classification configuration is "10% efficient", vs. a score of 90 being "90% efficient", and so on. In one embodiment, the traffic classification configuration wizard is invoked either when: 1) a user specifically invokes it through administrator interface 150, or 2) the efficiency store computed by traffic classification analyzer 145 drops below a threshold value.

The traffic classification configuration wizard, in one embodiment, assesses the /inbound and /outbound portions of the traffic classification configuration (or, each individual link) separately to identify proposed changes to the traffic classification configuration and estimate the effect on efficiency of the proposed change. FIG. 6 illustrates the overall process steps associated with identifying potential changes that will improve the performance efficiency of a given traffic classification configuration. As discussed more fully below, in one embodiment, the traffic classification configuration wizard examines the current traffic classification configuration for proposed changes (302). For each proposed change (304, 308), the traffic classification configuration wizard then estimates the effect of the proposed change on the performance efficiency of the resulting traffic classification configuration (306) and displays the top N proposed changes with the resulting estimated performance efficiency score (310).

In one embodiment, the changes proposed by the traffic classification configuration wizard can come from several possible sources:

1. Recent Changes To Traffic Classification Configuration (302a): In one embodiment, the traffic classification configuration wizard identifies recent changes to the traffic classification configuration and proposes for each change an action reversing it. As discussed above, the traffic classification configuration wizard would also display an estimate of the efficiency score resulting from the proposed change. In one embodiment, recent changes are the last N changes; alternatively, recent changes can be all changes to the traffic classification configuration since the traffic classification configuration wizard was last invoked.

2. Infrequently Matched Traffic Classes (302b): The traffic classification configuration wizard, in one embodiment, also identifies the traffic classes in the traffic classification configuration that have not been matched or have been matched to below a threshold number of flows during an analysis interval (e.g., the last week, day, hour, etc.).

3. Costly Matching Rules (302c): The traffic classification configuration wizard, in one embodiment, further analyzes the matching rules corresponding to each traffic class in relation to the computational costs associated with applying each matching rule. In one embodiment, the traffic classification configuration wizard determines which traffic classes have matching rules that cost the most "points", where points are determined by estimating how many resources are consumed matching one of these rules compared to the most simple rule. For example, if a simple rule costs 1 point to evaluate, then a complicated rule, in one embodiment, which involves comparing a URL string stored in the dynamic memory pool may cost 5 points.

As one skilled in the art will recognize, however, proposed changes can emanate from a variety of possible sources. For example, the traffic classification configuration wizard may identify a traffic class whose traffic naturally consumes a low amount of bandwidth regardless of the bandwidth utilization controls associated with the traffic class. Accordingly, the traffic classification configuration wizard may suggest deletion of the traffic class since it is not a large consumer of network bandwidth. In addition, the traffic classification configuration wizard may be more likely to suggest the deletion of automatically-discovered traffic classes (see above) that have not been or are infrequently matched, than traffic classes that have been specifically configured by a network administrator.

To provide an estimate of the efficiency score resulting from the proposed change, the traffic classification configuration wizard estimates of the performance efficiency score for the resulting traffic classification configuration by running a sample of representative network traffic through the traffic classification configuration with the proposed change applied, and calculating the new performance efficiency score. Representative network traffic, in one embodiment, may be a sample of actual network traffic sampled at periodic intervals during runtime and stored in a persistent memory, such as a hard disk drive (for example one second of traffic taken every hour, or the first 5 packets out of the flow for one out of every thousand flows, etc.). In another embodiment, representative network traffic may be generated based on a network traffic data set that is known to produce the same performance efficiency score with the current traffic classification configuration as the calculated score based on actual runtime conditions.

As discussed above, the traffic classification configuration wizard identifies and examines a number of proposed changes, calculates new performance efficiency scores resulting from each proposed change, and then displays the most significant proposed changes. For example, the traffic classification configuration wizard, in one embodiment, can present the following information in a user interface:

Your current traffic classification configuration score is 19.1. Your threshold is 20.0.

| Proposed Change | New Estimated Score | Apply? |
| --- | --- | --- |
| Delete/inbound/foo | 20.1 | o |
| Make/inbound/foo an exception class | 20.0 | o |
| Delete matching rule 3 from/inbound/xxx | 19.8 | o |
| Delete/inbound/xxx | 19.5 | o |
| Delete/inbound/yyy | 19.2 | o |

As the user interface provided above indicates, in one embodiment, the traffic classification configuration wizard facilitates implementation of the change by providing an "apply" button, which when clicked by a user causes the traffic classification configuration wizard to implement the corresponding proposed change to the current traffic classification configuration. In one embodiment, if the proposed change affects the bandwidth utilization control scheme associated with the current traffic classification configuration, the traffic classification configuration wizard warns the user (e.g., "warning:/inbound/xxx has a policy of rat 0 0 4. If you delete this traffic class, the policy applied to this traffic will change. Are you sure you want to implement this change?"). Otherwise, if no bandwidth utilization control is associated with the traffic class, the traffic classification configuration wizard allows the user to silently delete it. After a proposed change is implemented, the traffic classification configuration wizard evaluates the new traffic classification configuration to identify proposed changes and the resulting performance efficiency scores in the same manner.

Lastly, although the present invention has been described as operating in connection with end systems and proxies employing the HTTP, TCP and IP protocols, the present invention has application in computer network environments employing any suitable session layer, transport layer and network layer protocols. Moreover, while embodiments of the present invention have been described as operating in connection with bandwidth management devices featuring hierarchical network traffic classification trees, the present invention can also operate in connection with other network devices (such as routers and firewalls) maintaining other classification data structure types, such as access control lists, etc. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. An apparatus allowing for analysis of the performance of a network traffic classification configuration, comprising a computer-readable medium having executable computer instructions operated to implement:
 a traffic classification database storing a traffic classification configuration, wherein the traffic classification configuration includes at least one traffic class and at least one matching rule for that at least one traffic class; wherein the traffic classification database is operative to scan attributes associated with a data flow against the traffic classification configuration to identify a traffic class; and
 a traffic classification analyzer operative to analyze the performance of the traffic classification database and generate output indicative of the performance efficiency of the traffic classification configuration, wherein the traffic classification analyzer is operative to maintain a representative sample of actual network traffic and analyze the performance of the traffic classification database by applying the representative sample to the traffic classification configuration.

2. The apparatus of claim 1 further comprising:
 a measurement engine operative to maintain at least one variable characterizing the operation of the traffic classification database; and wherein the traffic classification analyzer is operative to analyze the performance of the traffic classification database based at least in part on the at least one variable maintained by the measurement engine.

3. The apparatus of claim 1 further comprising:
 a management information base to maintain at least one variable characterizing the operation of the traffic classification database; and wherein the traffic classification analyzer is operative to analyze the performance of the traffic classification database based at least in part on the at least one variable maintained by the management information base.

4. The apparatus of claim 3 further comprising:
a demon operative, when invoked, to access the management information base and store variables used by the traffic classification analyzer in a persistent memory.

5. The apparatus of claim 4 wherein the demon is invoked at periodic intervals.

6. The apparatus of claim 1 wherein the traffic classification analyzer is operative to generate a score indicative of the performance efficiency of the traffic classification configuration maintained by the traffic classification database.

7. The apparatus of claim 6 wherein the traffic classification analyzer is operative to notify a network administrator if the score is below a predetermined threshold.

8. The apparatus of claim 1 wherein the traffic classification analyzer is operative to assess the performance efficiency of the current traffic classification configuration by comparing the total number of observed matching rule comparisons to the total number of theoretically possible matching rules comparisons based on the traffic classification configuration and the number of data flows traversing the apparatus.

9. The apparatus of claim 8 wherein the comparison is weighted based on the computational costs associated with each matching rule in the traffic classification configuration.

10. The apparatus of claim 1 further comprising a traffic classification configuration wizard operative to identify at least one potential change to the traffic classification configuration to improve performance efficiency.

11. The apparatus of claim 10 wherein the traffic classification configuration wizard is operative to estimate the resulting performance gain associated with the at least one potential change.

12. The apparatus of claim 10 wherein the at least one potential change comprises a recent change to the traffic classification configuration.

13. The apparatus of claim 10 wherein the at least one potential change comprises the deletion of an infrequently matched traffic class.

14. The apparatus of claim 10 wherein the at least one potential change comprises the deletion of a computationally costly matching rule.

15. The apparatus of claim 10 wherein the traffic classification analyzer is invoked on a periodic bases.

16. A method allowing for analysis of the performance of network traffic classification configurations associated with a network device, comprising
monitoring the runtime performance of a traffic classification configuration in relation to at least one variable, wherein the traffic classification configuration comprises at least one traffic class and at least one corresponding matching rule associated with the at least one traffic class and wherein the monitoring comprises maintaining a count of the number of matching rule comparisons; and analyzing the performance of the traffic classification configuration based, at least in part, on the at least one variable; and generating output indicative of the performance efficiency of the traffic classification configuration.

17. The method of claim 16 wherein the monitoring step further comprises maintaining a count of failed matching rule comparisons.

18. The method of claim 16 wherein the monitoring step further comprises maintaining a count of successful matching rule comparisons.

19. The method of claim 16 wherein the traffic classification configuration is a hierarchical tree of traffic classes.

20. The method of claim 16 wherein the analyzing step comprises comparing the number of successful matching rule comparisons versus the number of failed matching rule comparisons.

21. The method of claim 16 wherein the analyzing step comprises comparing the number of actual matching rule comparisons to the maximum number of potential matching rule comparisons based on the traffic classification configuration.

22. The method of claim 16 further comprising
computing a score indicating the performance efficiency associated with the traffic classification configuration.

23. The method of claim 16 further comprising identifying changes to the traffic classification configuration that improve performance efficiency.

* * * * *